US004001735B2

United States Statutory Invention Registration [19]

[11] Reg. Number: H1735

Hansen et al.

[45] Published: Jun. 2, 1998

[54] EPDM ROOFING MEMBRANE ADHESIVE SYSTEM BASED ON HYDROGENATED STYRENE-DIENE-STYRENE BLOCK COPOLYMERS

[75] Inventors: David Romme Hansen; David L. Shafer, both of Houston, Tex.

[73] Assignee: Shell Oil Company, Houston, Tex.

[21] Appl. No.: 824,111

[22] Filed: Mar. 25, 1997

[51] Int. Cl.[6] ..... C08L 97/00

[52] U.S. Cl. ..... 524/505

[58] Field of Search ..... 524/505; 525/92 D, 525/95, 152

[56] References Cited

U.S. PATENT DOCUMENTS

| | | | |
|---|---|---|---|
| 4,104,323 | 8/1978 | Hansen | 524/505 |
| 4,141,876 | 2/1979 | Hansen | 524/505 |

FOREIGN PATENT DOCUMENTS

WO 90/14397 5/1990 WIPO .

*Primary Examiner*—Charles T. Jordan
*Assistant Examiner*—Meena Chelliah

[57] ABSTRACT

This invention is an EPDM roofing membrane adhesive system which comprises an outer protective layer of EPDM and an adhesive layer coated on the underside of said EPDM layer to adhere the membrane to a similarly coated EPDM membrane or to the primed surface of a roof. The adhesive layer comprises from 40 to 60 percent by weight of a hydrogenated styrene-diene-styrene block copolymer having a polystyrene content of from 20 to 40 percent by weight and an overall weight average molecular weight of from 50,000 to 150,000, from 15 to 35 percent by weight of a polyphenylene ether resin having an intrinsic viscosity of less than 0.35 deciliters per gram or of a high softening point endblock resin and from 15 to 35 percent by weight of a tackifying resin. Preferably, the molecular weight of the block copolymer is from 50,000 to 100,000 and the intrinsic viscosity of the polyphenylene ether is less than 0.2.

4 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

EPDM ROOFING MEMBRANE ADHESIVE SYSTEM BASED ON HYDROGENATED STYRENE-DIENE-STYRENE BLOCK COPOLYMERS

FIELD OF THE INVENTION

This invention relates adhesives which can bond an EPDM roofing membrane to itself as well as other substrates. More particularly, it relates to EPDM roofing membranes having high temperature resistant hydrogenated styrene-diene-styrene block copolymer adhesive compositions for adhering the membrane to itself or to the roof.

BACKGROUND OF THE INVENTION

EPDM (ethylene-propylene-diene monomer-based rubbery polymers) roofing membranes are a popular high performance roofing system. They have great durability, water barrier properties, and low temperature properties. However, EPDM membranes are difficult to bond and install in the field. Neoprene adhesive systems were used in the 1970's and early 1980's but they suffered from the disadvantage of marginal (low) peel strength (resistance to peeling), especially at elevated temperatures. They were too sensitive to drying conditions, cleaning procedures in the field, and gaps during bonding caused by the misalignment of the membranes when making the contact adhesive bond. Butyl rubber systems were developed in the 1980's to replace neoprene. They are also contact adhesives but have the advantage of higher peel strength, especially at high temperatures after the adhesive goes through a slow cure.

Adhesive systems for EPDM roofing membranes utilizing hydrogenated styrene-butadiene-styrene block copolymers have been evaluated in the past. These polymers would seem to be a natural fit for this use because of their high resistance to aging and similarity to EPDM. However, past efforts to utilize these polymers were not successful because the high temperature resistance was marginal and only modest adhesion was achieved.

Thus, it can be seen that it would be advantageous if a way could be found to utilize such copolymers to develop better peel properties, particularly at elevated temperatures. The present invention provides an adhesive composition which utilizes such copolymers and has good peel properties at room temperature and decent high temperature properties.

SUMMARY OF THE INVENTION

This invention is an EPDM roofing adhesive system which comprises an outer protective layer of EPDM and an adhesive layer coated on the underside of said EPDM layer to adhere the membrane to another similarly coated membrane or to a primed surface of a roof. The adhesive layer comprises from 40 to 60 percent by weight of a hydrogenated styrene-butadiene-styrene (S-B-S) or hydrogenated styrene-isoprene-styrene (S-I-S) block copolymer having a polystyrene content of from 20 to 40 percent by weight and an overall weight average molecular weight of from 50,000 to 150,000, from 15 to 35 percent by weight of a polyphenylene ether resin having an intrinsic viscosity of less than 0.35 deciliters per gram or of a high softening point endblock reinforcing resin, and from 15 to 35 percent by weight of a tackifying resin. Preferably, the molecular weight of the block copolymer is from 50,000 to 100,000 and the intrinsic viscosity of the polyphenylene ether is less than 0.2.

DETAILED DESCRIPTION OF THE INVENTION

EPDM is a commonly used abbreviation for ethylene-propylene diene monomer. These monomers are used to make EPDM polymers, ethylene-propylene terpolymers which are elastomers based on linear terpolymers of ethylene, propylene, and small amounts of a nonconjugated diene such as hexadiene, dicyclopentadiene, or ethylidene norborene. These polymers are useful in roofing applications, after vulcanization, because of their elastomeric nature and resistance to moisture, to UV attack, and to temperature aging. Roofing membranes of such materials are made of EPDM, carbon black, oil, antioxidants, and vulcanization agents. An adhesive composition is coated on the underside of the membrane and can be used to bond to another similarly coated membrane or a coated surface of the roof.

As described above, the adhesive composition of this invention is comprised of a hydrogenated styrene-butadiene-styrene block copolymer, a polyphenylene ether (PPE) or an endblock reinforcing resin, and a tackifying resin. The block copolymer should comprise from 40 to 60 percent by weight. The PPE or endblock resin must comprise from 15 to 35 percent by weight. The tackifying resin is added to enhance adhesion and lower viscosity.

The second primary component of the compositions of the present invention may be a low molecular weight polyphenylene ether resin (PPE), such as polyphenylene oxide (PPO), having an intrinsic viscosity of less than 0.35 deciliters per gram (dl/g), when measured in solution in chloroform at 25° C., and preferably less than 0.2 dl/g.

The polyphenylene ether resin is preferably one which is comprised of the formula:

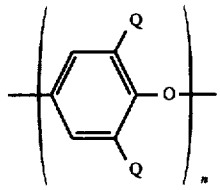

wherein the oxygen ether atom of one of the units is connected to the benzene nucleus of the next adjoining unit, n is a positive integer and each Q is a monovalent substituent selected from the group consisting of hydrogen, halogen, hydrocarbon radicals free of a tertiary alpha carbon atom, halohydrocarbon radicals having at least two carbon atoms between the halogen atom and the phenyl nucleus, hydrocarbonoxy radicals and halohydrocarbonoxy radicals having at least two carbon atoms between the halogen atom and the phenyl nucleus.

For purposes of the present invention, an especially preferred family of polyphenylene ethers includes those having alkyl substitution in the two positions ortho to the oxygen ether atom, i.e., those of the formula wherein each Q is alkyl, most preferably having from one to four carbon atoms. The most preferred polyphenylene ether resin for the purposes of this invention is poly(2,6-dimethyl-1,4-phenylene) ether.

In general, the polyphenylene ether resins of this invention can be prepared by the following procedures fully described in U.S. Pat. Nos. 3,306,874 and 3,257,375, which are herein incorporated by reference. The polyphenylene ethers are self-condensation products of monohydric monocyclic phenols typically produced by reacting the phenols in the presence of a complexing agent or complex metal, e.g., copper catalyst. In general, the molecular weight will be controlled by the reaction time with longer times providing a higher average number of repeating structural units. For low molecular weight PPE, at some point before an intrinsic viscosity of 0.25 deciliters per gram, is obtained, the reaction is terminated. Termination can be brought about by the use of conventional means. For instance, in the case of reaction systems which make use of complex metal catalysts, the polymerization reaction can be terminated by adding an acid, e.g., hydrochloric or sulfuric acid, or the like, or a base, e.g., lime, sodium hydroxide, potassium hydroxide, and the like, or the product is separated from the catalyst by filtration, precipitation or other suitable means.

An endblock resin is often included in adhesive or sealant formulations to reinforce the styrene portion of the block coploymer. In this case, a high softening point endblock resin may be used as an alternative to the PPE resin to increase the high temperature resistance of the EPDM adhesive of the present invention. The endblock (compatible) resin is a resin which is compatible with the styrene block which is normally on the end of the block copolymers of the present invention. Normally, these resins should have a ring and ball softening point of 150° C or more for use in formulating EPDM adhesives. Useful resins include coumarone-indene resins, poly alpha methyl styrene resins, polystyrene resins, vinyl toluene-alpha-methyl styrene copolymers and polyindene resins.

Examples of aromatic resins useful in the formulations of the present invention are CUMAR® series resins and CUMAR LX-509 (NEVILLE), which are composed of coumarone-indene and ENDEX® 155 (HERCULES), a resin derived by copolymerization of pure aromatic monomers.

It is usually necessary to add an adhesion promoting or tackifying resin that is compatible with the hydrogenated styrene-butadiene-styrene block copolymer. For long term stability required for roofing applications it is usually best to use hydrogenated tackifying resins such as Arkon® P-85, Regalrez® 1085, or Escorez 5380. Other resins which are also useful in compositions of the present invention include those which are hydrogenated, such as hydrogenated rosins, esters of rosins, polyterpenes, terpene phenol resins and polymerized mixed olefins, lower softening point resins and liquid resins. An example of a liquid resin is Regalrez® 1018 resin (a hydrogenated pure monomer resin) from Hercules. The selection of the particular tackifying resin is, in large part, dependent upon the specific polymer employed in the respective adhesive or sealant composition.

The hydrogenated styrene-butadiene-styrene block copolymer is the primary component of the adhesive composition. It has a polystyrene content of from 20 to 40 percent by weight and an overall weight average molecular weight of from 50,000 to 150,000, preferably 50,000 to 100,000. The polystyrene content is important because it can influence the compatibility with the endblock resins. If the molecular weight is less than 50,000, then the strength is low and if it is more than 150,000, then the viscosity is very high.

The molecular weights of linear polymers or unassembled linear segments of polymers such as mono-, di-, triblock, etc., or the arms of star polymers before coupling are conveniently measured by Gel Permeation Chromatography (GPC), where the GPC system has been appropriately calibrated. For anionically polymerized linear polymers, the polymer is essentially monodisperse (weight average molecular weight/number average molecular weight ratio approaches unity), and it is both convenient and adequately descriptive to report the "peak" molecular weight of the narrow molecular weight distribution observed. Usually, the peak value is between the number and the weight average. The peak molecular weight is the molecular weight of the main species shown on the chromatograph. For polydisperse polymers the weight average molecular weight should be calculated from the chromatograph and used. The materials used in the columns of the GPC are styrene-divinyl benzene gels or silica gels. The solvent is tetrahydrofuran and the detector is a refractive index detector.

In general, the polymers useful in this invention may be prepared by contacting the monomer or monomers with an organoalkali metal compound in a suitable solvent at a temperature within the range from −150° C. to 300° C., preferably at a temperature within the range from 0° C. to 100° C. Particularly effective polymerization initiators are organolithium compounds having the general formula:

$$RLi$$

wherein R is an aliphatic, cycloaliphatic, alkyl-substituted cycloaliphatic, aromatic or alkyl-substituted aromatic hydrocarbon radical having from 1 to 20 carbon atoms.

Suitable solvents include those useful in the solution polymerization of the polymer and include aliphatic, cycloaliphatic, alkyl-substituted cycloaliphatic, aromatic and alkyl-substituted aromatic hydrocarbons, ethers and mixtures thereof. Suitable solvents, then, include aliphatic hydrocarbons such as butane, pentane, hexane, heptane and the like, cycloaliphatic hydrocarbons such as cyclohexane, cycloheptane and the like, alkyl-substituted cycloaliphatic hydrocarbons such as methylcyclohexane, methylcycloheptane and the like, aromatic hydrocarbons such as benzene and the alkyl-substituted aromatic hydrocarbons such as toluene, xylene and the like and ethers such as tetrahydrofuran, diethylether, di-n-butyl ether and the like.

The hydrogenation of these polymers may be carried out by a variety of well established processes including hydrogenation in the presence of such catalysts as Raney Nickel, noble metals such as platinum, palladium and the like and soluble transition metal catalysts. Suitable hydrogenation processes which can be used are ones wherein the diene-containing polymer or copolymer is dissolved in an inert hydrocarbon diluent such as cyclohexane and hydrogenated by reaction with hydrogen in the present of a soluble hydrogenation catalysts. Such processes are disclosed in U.S. Pat. Nos. 3,113,986, 4,226,952 and Reissue 27,145, the disclosures of which are herein incorporated by reference. The polymers are hydrogenated in such a manner as to produce hydrogenated polymers having a residual unsaturation content in polydiene blocks of less than about 1 percent, and preferably as close to 0 percent as possible, of their original unsaturation content prior to hydrogenation. The styrene blocks remain unhydrogenated. A titanium catalyst such as disclosed in U.S. Pat. No. 5,039,755, which is herein incorporated by reference, may also be used in the hydrogenation process.

EXAMPLES

The following polymers were used in this example. Polyme A is a hydrogenated SBS block copolymer having a molecular weight of 107,000 and a polystyrene content of 29 percent by weight. Polymer B is a blend of 23 percent by weight of 0.3 intrinsic viscosity polyphenylene oxide (PPO) and 77 percent by weight of Polymer C. Polymer C is a hydrogenated SBS block copolymer having a molecular weight of 79,000 and a polystyrene content of 29 percent by weight. Polymer D is a hydrogenated SBS block copolymer having a molecular weight of 190,000 and a polystyrene content of 31 percent by weight.

EPDM T-peel samples were made by two different methods. In the first method 0.060 inch thick commercial EPDM roofing membranes from Carlisle Rubber were cut into one inch wide strips and cleaned with a rag and toluene. The adhesive solutions were applied liberally with a brush and the strips were sandwiched together in pairs, wet adhesive to wet adhesive. The bonded strips while still wet were placed between glass plates to maintain pressure on the sandwich construction until they were dry. If no pressure was applied the EPDM membranes would swell causing curling which resulted in incomplete bonding. Even with the applied pressure there was evidence of some incomplete bonding. The EP-95 was a commercial butyl rubber-based EPDM adhesive from Carlisle Rubber which was prepared in a slightly different manner since it is a contact adhesive. The EP-95 adhesive was applied liberally to the cleaned EPDM strips and allowed to dry until it was not tacky to the touch. Two strips were then contacted with each other and pressed between the glass plates similar to the other adhesives. Table 1 shows the results of the T-peels for formulations made by this method at 25° C. The block copolymer adhesives exhibited peel strengths equal to or significantly greater than the commercial EPDM contact adhesive.

The curling was judged to be very undesirable for making bonds of EPDM roofing membranes in the field so another bonding approach was utilized for the data shown in Table 2. In the second method, the EPDM strips were again cleaned with toluene and a rag to remove the talc and other contaminants from the surface. The block copolymer adhesive solutions were applied liberally with a brush in either one (thin) or two coats (thick). The coated strips were dried in a hood for one day and a vacuum oven at 40° C. for 2 days. Two coated strips were then brought together (adhesive to adhesive) and pressed for 5 minutes at 150° C. in a press with enough pressure to squeeze some of the adhesive out the sides of the strips. This was an attempt to simulate what might happen using a hot iron or a hot air gun. The commercial EPDM contact adhesive (EP-95) in Table 2 was prepared using the same method as in Table 1 except no pressure was applied to hold the strips together. As can be seen in Table 2, the results for the EP-95 were the same but the block copolymer adhesives increased further and were double the EP-95 value. The T-peels were also tested at 700° C. (a possible temperature which block roofing membranes could achieve on a hot day in the southern climates). Here again the block copolymer adhesives were superior to the commercial contact adhesive. The KRATON G 1650 formulations appeared to perform the best. The solutions appeared to be the most compatible (clarity) and the peels were the highest. At 100° C., the formulations of this invention did not perform as well as the EP-95.

Although it was not tested, it is envisioned that the EPDM membranes could be primed with a dilute solution of the adhesive and then dried quickly. A film of the adhesive with no solvent (conceivably made my an extrusion process) could then be sandwiched in between the two primed membranes and sealed together with a hot iron or a hot air gun like what is typically used for bonding PVC roofing membranes.

TABLE 1

| Formulation[1] | A | B | C | G | J | N[2] |
|---|---|---|---|---|---|---|
| EP-95 | | | | | | 100 |
| Polymer A | 50 | 50 | 50 | | 50 | |
| Polymer B[3] | | | | 75 | | |
| Regalrez 1085 | 25 | 25 | 25 | 25 | 25 | |
| 0.115 IV PPO | | 25 | | | | |
| 0.15 IV PPO | | | 25 | | | |
| 0.32 IV PPO | | | | | 25 | |
| Endex 155 | 25 | | | | | |
| T Peel Values (#/linear in) | 6.7 | 10.0 | 11.4 | 7.5 | 11.0 | 6.6 |

[1]All formulations are 30% solids in Toluene.
[2]T Peel strips for Formulation N were prepared as a contact cement (dry to the touch before bonding).
[3]Polymer B is a blend of 23% 0.3 IV PPO and 77% Polymer C.

TABLE 2

| Formulation | Control | A | B | C |
|---|---|---|---|---|
| EP-95 | 100 | | | |
| Polymer C | | 49 | | |
| Polymer A | | | 49 | 49 |
| Polymer D | | | | |
| Regalrez 1085 | | 25 | 25 | 25 |
| 0.12 IV PPO | | 25 | 25 | |
| Endex 155 | | | | 25 |
| Irganox 1010 | | 1 | 1 | 1 |
| % solids in Toluene | | 35 | 30 | 35 |
| Color/Appearance of adhesive solution | opaque black | hazy cloudy brown | clear brown | clear water white[5] |
| T Peel Values (pli) | | | | |
| 25° C. | | | | |
| Condition A[4] Thin | 8.6 c[1] | 19.0 c | 15.8 a[2] | 16.4 a |
| Condition B Thick | nt[6] | 21.3 sl c | 13.7 a | 16.3 sl c |
| 70° C. | | | | |
| Condition B Thick | 2.9 c | 2.4 a | 4.8 a | 5.0 c |
| 100° C. Condition B | 3.4 | 1.4 | 0.8 | 1.4 |

[1]c—Sample failure was cohesive.
[2]a—Sample failure was adhesive.
[3]sl c—Sample failure was slightly cohesive.
[4]Condition A - Formulation was applied liberally to strips of EPDM. Strips were dried 1 day in hood and 2 days in 40° C. vacuum oven. Strips were laminated for 5 min. at 150° C. with moderate pressure.
[5]Adhesive turned cloudy (opaque white) when applied to EPDM and solvent began to evaporate. Adhesive dried opaque white in Condition B.
[6]nt—Adhesive not tested under this condition.

We claim:

1. An EPDM roofing membrane adhesive composition which comprises from 40 to 60 percent by weight of a hydrogenated styrene-butadiene-styrene or styrene-isoprene-styrene block copolymer having a polystyrene content of from 20 to 40 percent by weight and an overall weight average molecular weight of from 50,000 to 150,000, from 15 to 35 percent by weight of a polyphenylene ether resin having an intrinsic viscosity of less than 0.35 deciliters per gram, and from 15 to 35 percent by weight of a tackifying resin.

2. The adhesive composition of claim 1 wherein the molecular weight is from 50,000 to 100,000 and the intrinsic viscosity of the polyphenylene ether is less than 0.2.

3. An EPDM roofing membrane adhesive composition which comprises from 40 to 60 percent by weight of a hydrogenated styrene-butadiene-styrene or styrene-isoprene-styrene block copolymer having a polystyrene content of from 20 to 40 percent by weight and an overall weight average molecular weight of from 50,000 to 150,000, from 15 to 35 percent by weight of a end block reinforcing resin, having a ring and ball softening point of 150° C. or more, and from 15 to 35 percent by weight of a tackifying resin.

4. The adhesive composition of claim 3 wherein the molecular weight is from 50,000 to 100,000.

* * * * *